United States Patent (10) Patent No.: US 9,090,777 B2
Agur et al. (45) Date of Patent: Jul. 28, 2015

(54) LOW COST PROCESS FOR SOLID INK USING DRY FLUSHED PIGMENTS

(71) Applicant: XEROX CORPORATION, Norwalk, CT (US)

(72) Inventors: Enno Eric Agur, Toronto (CA); Karina Lopez, Richmond Hill (CA); Santiago Faucher, Oakville (CA); Biby Abraham, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 145 days.

(21) Appl. No.: 13/857,035

(22) Filed: Apr. 4, 2013

(65) Prior Publication Data

US 2014/0303297 A1 Oct. 9, 2014

(51) Int. Cl.
*C09B 67/20* (2006.01)
*C09D 11/00* (2014.01)
*C09D 11/34* (2014.01)
*C09D 11/322* (2014.01)

(52) U.S. Cl.
CPC ............ *C09B 67/006* (2013.01); *C09D 11/322* (2013.01); *C09D 11/34* (2013.01)

(58) Field of Classification Search
CPC ..... C09B 67/006; C09D 11/34; C09D 11/322
USPC ....................................... 106/31.67; 524/230
See application file for complete search history.

(56) References Cited

U.S. PATENT DOCUMENTS

| 4,627,875 A | 12/1986 | Kobayashi et al. |
| 4,737,190 A | 4/1988 | Shimada et al. |
| 4,830,671 A | 5/1989 | Frihart et al. |
| 4,889,560 A | 12/1989 | Jaeger et al. |
| 4,889,761 A | 12/1989 | Titterington et al. |
| 5,156,675 A | 10/1992 | Breton et al. |
| 5,169,437 A | 12/1992 | You |
| 5,194,638 A | 3/1993 | Frihart et al. |
| 5,207,824 A | 5/1993 | Moffatt et al. |
| 5,372,852 A | 12/1994 | Titterington et al. |
| 5,389,958 A | 2/1995 | Bui et al. |
| 5,597,856 A | 1/1997 | Yu et al. |
| 5,750,604 A | 5/1998 | Banning et al. |
| 5,780,528 A | 7/1998 | Titterington et al. |

(Continued)

FOREIGN PATENT DOCUMENTS

| GB | 2 238 792 | 6/1991 |
| GB | 2 290 793 | 1/1996 |

(Continued)

*Primary Examiner* — John Uselding
(74) *Attorney, Agent, or Firm* — Pillsbury Winthrop Shaw Pittman LLP

(57) ABSTRACT

A dry flushed pigment comprises a dry pigment and a flushing agent. Particles of the dry pigment are dispersed into the flushing agent. The dry flushed pigment may have at least 20 percent by weight dry pigment. The dry flushed pigment may have a range of 20 to 80 percent dry pigment by weight. A pigment concentrate comprising a dry flushed pigment and one or more of a group of an ink carrier, a dispersant, or a synergist, where the dry flushed pigment is mixed with one or more of the ink carrier, dispersant or synergist and then milled to create the pigment concentrate. The pigment in the pigment concentrate has a Z-average particle size in the range of 75 nm to 250 nm. The pigment in the pigment concentrates is present in the amount from about 15 to 60 percent by weight of the pigment concentrate.

8 Claims, 1 Drawing Sheet

0 Presentation Title

(56) References Cited

U.S. PATENT DOCUMENTS

| | | |
|---|---|---|
| 5,782,966 A | 7/1998 | Bui et al. |
| 5,783,658 A | 7/1998 | Banning et al. |
| 5,827,918 A | 10/1998 | Titterington et al. |
| 5,830,942 A | 11/1998 | King et al. |
| 5,919,839 A | 7/1999 | Titterington et al. |
| 6,174,937 B1 | 1/2001 | Banning et al. |
| 6,255,432 B1 | 7/2001 | Evans et al. |
| 6,309,453 B1 | 10/2001 | Banning et al. |
| 6,860,930 B2 | 3/2005 | Wu et al. |
| 7,377,971 B2 | 5/2008 | Wu et al. |
| 7,381,254 B2 | 6/2008 | Wu et al. |
| 7,407,539 B2 | 8/2008 | Wu et al. |
| 7,973,186 B1 | 7/2011 | Goredema et al. |
| 2002/0034696 A1* | 3/2002 | Wolf et al. ......... 430/7 |
| 2009/0297714 A1 | 12/2009 | Wong et al. |

FOREIGN PATENT DOCUMENTS

| | | |
|---|---|---|
| GB | 2 294 939 | 5/1996 |
| GB | 2 305 670 | 4/1997 |
| GB | 2 305 928 | 4/1997 |
| WO | 94/14902 | 7/1994 |
| WO | 95/04760 | 2/1995 |
| WO | 96/14364 | 5/1996 |
| WO | 97/12003 | 4/1997 |
| WO | 97/13816 | 4/1997 |
| WO | 97/33943 | 9/1997 |

* cited by examiner

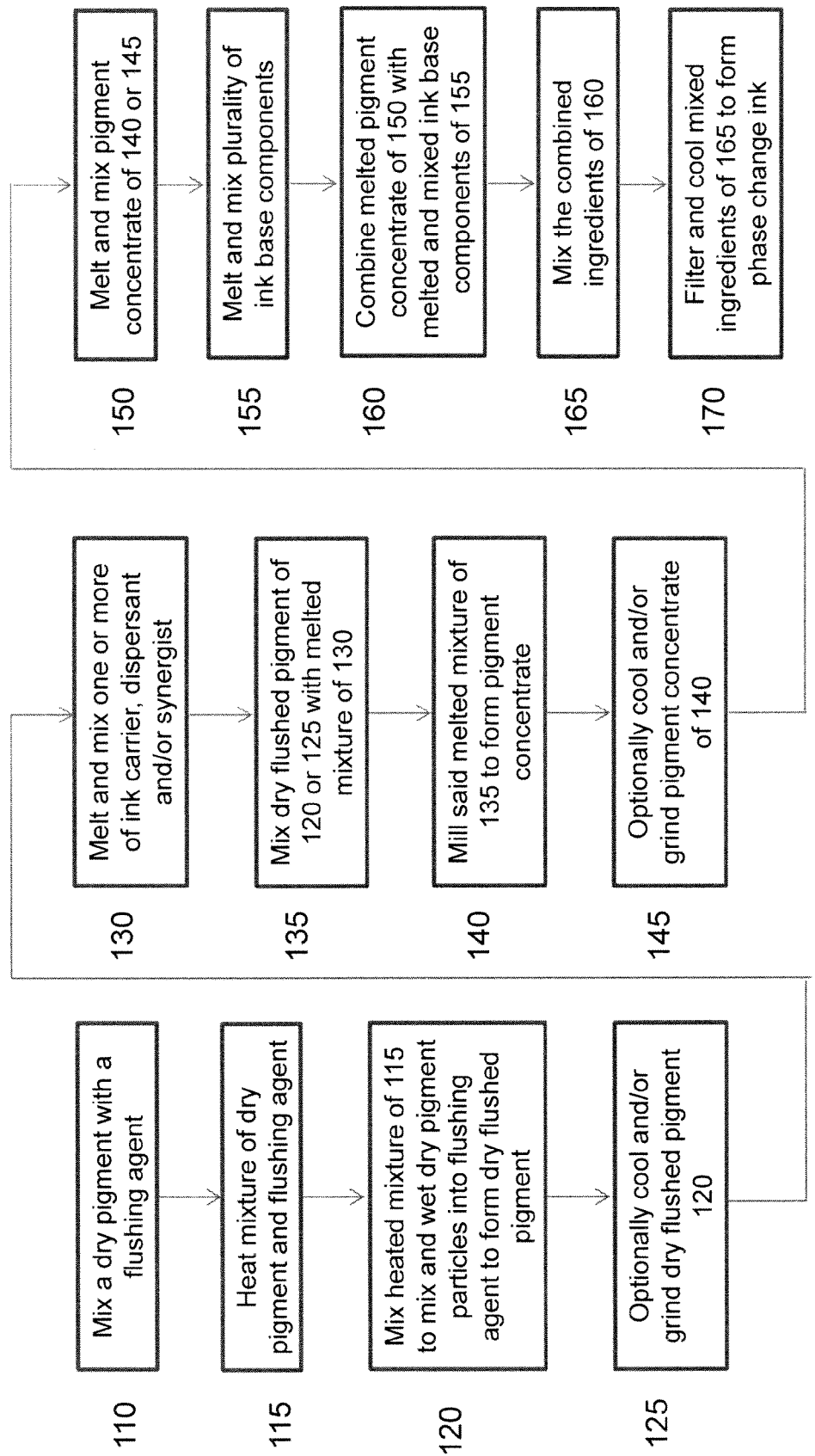

LOW COST PROCESS FOR SOLID INK USING DRY FLUSHED PIGMENTS

BACKGROUND

The present disclosure is generally directed to phase change inks, Moreover, the present disclosure is directed to the preparation of phase change inks using dry flushed pigments. In an acoustic or piezoelectric inkjet system, ink droplets are propelled to the recording medium by means of a piezoelectric oscillator. In such a system, a recording signal is applied to a recording head containing the piezoelectric oscillator, causing droplets of the ink to be generated and subsequently expelled through the printhead in response to the recording signal to generate an image on the recording medium. In this printing system, a recording signal is converted into a pulse by a signal processing means, such as a pulse converter, and then applied to the piezoelectric oscillator. A change in pressure on the ink within an ink chamber in the printhead caused by the recording signal results in droplets of ink being ejected through an orifice to a recording medium. Such an inkjet system is described in more detail, for example, in U.S. Pat. No. 4,627,875, the disclosure of which is totally incorporated herein by reference.

Thermal inkjet printing processes are described in more detail, for example, in U.S. Pat. Nos. 5,169,437 and 5,207,824, the disclosures of which are totally incorporated herein by reference.

In these and other inkjet recording processes, it is necessary that the ink being used meet various stringent performance characteristics. These performance characteristics are generally more stringent than those for other liquid ink applications, such as for writing instruments (a fountain pen, felt pen, and the like).

Further, there are many requirements for the liquid compositions including the above-described inks for inkjet recording, and specific examples thereof include. (1) no clogging of nozzles of inkjet recording heads; (2) superior ejection stability and frequency responsiveness; (3) good recovery of smooth ink ejection after residing in printhead for a long time, such as greater than two weeks; (4) no generation of precipitates even after long-term storage; (5) no corrosion-deterioration of members, such as the recording heads, which contact therewith; (6) provision of favorable printing quality; (7) safety and no unpleasant odor; and the like.

Various inks for inkjet printing processes are known in the art. For example, various inkjet inks are disclosed in U.S. Pat. Nos. 4,737,190 and 5,156,675.

Although numerous inkjet inks are presently available, they generally do not meet all of the above-described requirements, while also providing excellent print quality on plain paper. In particular, the inks generally used in inkjet printing processes, while producing acceptable print quality, do not produce the high print quality that is achieved by using dry toner compositions, such as in electrostatographic imaging processes.

A need continues to exist in the inkjet industry for improved inkjet inks, and processes for producing the same, that satisfy the above-described requirements while providing high quality prints on a wide variety of recording media, including plain paper. Although some currently available inkjet inks may provide waterfast images with better substrate latitude, the inks are unacceptable in that they generally smear and have poor latency and maintainability characteristics. In addition, such inks are generally difficult to manufacture. Thus, there remains a need in the inkjet ink industry for improved black and colored inks that can be easily prepared and can be obtained at a lower cost.

One type of inkjet ink is a phase change ink that contains pigments. Pigments are a lower cost alternative to dyes. Pigments are insoluble, fine particle size materials used in a number of applications including ink formulations, coatings, paints and the like to provide color, to hide substrates, to modify the properties of coatings, and to modify the performance properties of films.

However, pigments are often supplied by the manufacturer as dry aggregates and agglomerates that are many times larger than the primary particle size (which often is less than 100 nm in diameter). Thus, with these pigments, a pigment manufacturer must perform a size reduction step. For example, the pigments needs to be reduced to a size nominally about 100 nm in diameter, with a narrow particle size distribution in the final ink formulation. The size reduction is necessary in order to achieve good ink jetting and print quality performance. Print head jet sizes are getting smaller and smaller, so a small pigment particle size is crucial in high quality inks. Pigments useful for pigmented phase change ink application range in cost from less than $20 per kilogram to less than $100 per kilogram. However, the particle size reduction costs also need to be added into this preparation cost.

The technology utilized in pigment particle size reduction is an important field in the printing and coating industries. In xerographic printing applications, aqueous pigment dispersions for Xerox's emulsion aggregation toners are produced by milling the solid pigments together with a surfactant and water in milling equipment such as, for example, small media mills, homogenizers and the like. This results in pigment particles sizes ranging between 100 and 200 nm in diameter. Similar pigments used in paints and other coatings are size reduced by means of various media mills technologies. For example, in the case of conventional toners for monochrome xerography, carbon black is dispersed in the toner medium by means of extrusion melt mixing.

An effective known method of size reducing pigments is the formation of pigment concentrates or masterbatches. The pigment concentrate is then milled down to the final pigment loading for the product, where the pigment loading may be as low as 1 to 2 percent by weight. Under certain operating conditions, the pigment concentrate is produced in one location and the final product in another location that may be hundreds or thousands of kilometers away. Therefore the cost of transportation is an important factor in the economics of making pigmented products.

In the case of pigment phase change ink, it is useful to produce a pigment concentrate including pigment and a carrier (for example, wax such as Kemamide® S-180 stearyl stearamide wax). Initially, the concentrate was made using an attritor and this produced concentrates comprising about 20 percent by weight of pigment. This process was performed at elevated temperatures (about 120° C.) for periods up to seven days. Pigment concentrates were then made using a more efficient process, where the concentrate was produced in a basket or immersion mill (for example, the Hockmeyer immersion mill). The Hockmeyer micro mill included a jacketed vessel and a milling head (basket assembly). The grinding media utilized in the milling head can include for example, zirconia particles. The milling time for pigment concentrates containing pigments as high as 40 percent by weight has been reduced to less than 5 hours. Thus, the cost of making a pigment concentrate in a process that requires 5 hours is substantially less than in a process that requires 7 days.

Although the Hockmeyer process provides good quality dispersion in the carrier within a few hours, the Hockmeyer process requires operation of the disperser blade in the milling head at very high rotational speeds, for example, 5000 revolutions or more per minute or higher. This high energy operation results in excessive wear of not only the milling media, but also the parts of the milling head (that is the shaft, peg hub, counterpegs, screen, etc.). This in turn results in contamination of the pigment concentrate and the need for frequent parts replacement. A further significant issue is that there is a need for a wetting step in the pigment dispersion process. The dry pigment has to be wetted in the carrier for periods of time equal to or greater than the milling time. Accordingly, there is a need to further reduce the cost of producing the pigment concentrates for the phase change ink formulations.

An effective method for supplying finely dispersed pigments for toners for xerographic printing applications is via flushed pigments. Flushed pigments have significantly better pigment dispersion in melt mixed toners versus dry pigment. In a nominal pigment manufacturing process, pigments can be precipitated or crystallized out of an aqueous mixture or solution. After the water is filtered out, the product is called presscake (or wetcake). If the presscake is further dried to produce pigment powder, the aggregated and/or agglomerated pigment particles require high amounts of energy to redisperse in a toner in a melt mixing device (for example, an extruder). In the flushing process, the presscake is mixed together with the toner resin at high pigment loading and heated in a flusher (for example, an extruder, sigma mixer or the like). As the toner resin heats up and then softens with an optional application of vacuum, the water between the pigment particles is displaced by the resin. This results in a mixture of pigment in resin which is called "flushed pigment" or "wet flushed pigment." The name "wet flushed pigment" is utilized (that is, "flushed pigment" or "flushed pigment from presscake") to differentiate from the dry flushed pigment of the present invention. The advantage of the flushing processes is that the pigment particles are not allowed to aggregate, thereby the dispersion quality of the flushed pigment in toner is better than for dry pigment. For example, U.S. Pat. No. 5,866,288 describes the use of flushed pigments for toners and the better dispersion quality.

US Patent Application 20090297714, assigned to Xerox and hereby incorporated by reference, discloses a process for the preparation of phase change inks where pigments are introduced to the ink formulation in the form of flushed pigments. The flushing process includes aqueous presscake of pigments converted to flushed pigment with the addition of various ink components such as wax, etc. However, there was no identification as to whether this process performed sufficiently to produce high quality inks.

SUMMARY OF THE INVENTION

In embodiments of the invention, a dry flushed pigment comprises a dry pigment and a flushing agent, where the particles of the dry pigment are dispersed into the flushing agent. The dry flushed pigment has at least 20 percent by weight dry pigment. The dry flushed pigment has a range of 20 to 80 percent by weight dry pigment. In embodiments of the invention, a process for preparing a pigment concentrate for a phase change ink utilizing a dry flushed pigment comprises mixing a dry pigment with a flushing agent, heating the mixture of the dry pigment and the flushing agent, and mixing the heated mixture of the dry pigment and the flushing agent to wet the pigment with the flushing agent and to disperse particles of the pigment into the flushing agent to create a dry flushed pigment. In embodiments of the invention, a vacuum may be applied to the dry pigment during the mixing step to draw out air from the particles of the dry pigment. In embodiments of the invention, the process further comprises melting and mixing one or more of a group consisting of an ink carrier, a dispersant, or a synergist; mixing the dry flushed pigment with said melted mixture; and milling the said melted mixture to create a pigment concentrate. The milling may be performed using an attrition process. In embodiments of the invention, the process may further comprise cooling the pigment concentrate and grinding the pigment concentrate.

In embodiments of the invention, a pigment concentrate includes a dry flushed pigment and one or more of a group of an ink carrier, a dispersant or a synergist. The dry flushed pigment is mixed with one or more of the ink carrier, dispersant or synergist and then milled to create the pigment concentrate. The pigment present in the pigment concentrate is present in the amount from about 15 to 60 percent by weight of the pigment concentrate. The pigment in the pigment concentrate has a Z-average particle size in the range of 75 nm to 250 nm. The pigment concentrate has a Polydispersity Index in the range of 0.01 to 0.5. In the pigment concentrate, the dispersant to pigment ratio by weight is in the amount of 0.05 to 2. In the pigment concentrate, the synergist to pigment ratio by weight is in the amount of 0.05 to 2. In preparing a phase change ink utilizing a pigment concentrate created from a dry flushed pigment includes a high shear mixer or a high torque mixer to mix a dry pigment with a flushing agent until particles of the dry pigment are wetted and dispersed within the flushing agent and a cooling apparatus to cool the dry flushed pigment. In embodiments of the invention, the system may include vacuum to draw out air from the particles of the dry pigment. In embodiments of the invention, the cooling apparatus is a circulator bath, a cold gun air cooling system or a cryogenic cooling device.

In embodiments of the invention, the system may further include an attritor to receive and melt one or more of a group consisting of an ink carrier, a dispersant and a synergist, and milling media which is added to the attritor and mixed into the melted mixture. In embodiments of the invention, the attritor receives the dry flushed pigment and mixes the dry flush pigment with the melted mixture and the milling media grinds the mixed dry flushed pigment and melted mixture to form a pigment concentrate.

In embodiments of the invention, a phase change ink comprises a pigment concentrate made utilizing a dry flushed pigment, an ink carrier, a dispersant and an optional synergist. The pigment is present in the amount from about 15 to 60 percent by weight of the pigment concentrate. The pigment in the pigment concentrate has a Z-average particle size in the range of 75 nm to 250 nm.

BRIEF DESCRIPTION OF THE DRAWINGS

For a better understanding of the present embodiments, reference may be had to the accompanying figures.

FIG. 1 illustrates a process of preparing a phase change ink utilizing a dry flushed pigment according to an embodiment of the invention.

DETAILED DESCRIPTION

In the following description, it is understood that other embodiments may be utilized and structural and operational changes may be made without departure from the scope of the present embodiments disclosed herein.

General Overview

In an embodiment of the invention, a process for preparing a phase change ink comprises applying (i) a first mixing step to a pigment and a flushing agent to form a flushed pigment; (ii) applying a second mixing step to the flushed pigment and additional one or more ink ingredients to form a pigment concentrate; and (iii) applying a third mixing step to the pigment concentrate and additional one or more ink ingredients to form the final ink formulation.

Dry Flushed Pigment Preparation

For wet flushed pigments described in Patent Publication No. 20090297714, the first mixing step flushes a pigment in the form of a wetcake from an aqueous phase to a nonaqueous phase to form a pigment dispersion. For the dry flushed pigments utilized in the invention, a dry pigment is used instead of wetcake and no water is removed during the flushing process. Flushing of a wet pigment or a dry pigment, occurs at a high temperature such that the flushing agent is softened or melted. The temperature may range, for example, from 80° C. to 160° C., by intensely mixing the pigment with the said flushing agent.

In embodiments of the invention, the dry flushed pigment may comprise a flushing agent and a dry pigment. The flushing agent can be a resin (for example, a triamide resin or a glycerol ester of a hydrogenated rosin, or mixtures thereof). In embodiments of the invention, it is preferable that the flushing agent be one of the components of the final phase change ink. In embodiments of the invention, the flushing agent is preferably the ink carrier. The dry flushed pigment may comprise about 60 percent by weight pigment and about 40 percent by weight flushing agent. In embodiments of the invention, the weight of the pigment in the dry flushed pigment concentrate may range from about 20 to about 80 percent with the flushing agent having a respective weight range of about 20 to 80 percent. In an embodiment of the invention, the dry flushed pigment is comprised of a magenta PR57:1 pigment mixed with a flushing agent of Kemamide® S-180 stearyl stearamide wax.

The dry flushed pigment may be made according to the following method. The mixing in the flushing process can be achieved by high shear mixing or by high torque mixing. High shear apparatuses include, for example, rotor stator mixing devices, a Kady® mill, a Ross X series mixer, or various high shear homogenizers, for example, an IKA® Ultra Turrax T50 Homogenizer equipped with appropriate dispersing elements. The high shear mixing apparatus can have a speed of, for example, from about 1,000 revolutions per minute to about 15,000 revolutions per minute. High torque mixing apparatuses include, for example, kneaders, extruders, sigma-blade mixers, agitated vessels and the like. A high torque is required due to the high viscosity of the high pigment loading in resin and where the said viscosity exceeds, for example, about 1 Pascal-second. The apparatus used in high torque mixing usually operate at much lower speeds, for example less than 1,000 revolutions per minute.

During the flushing step, heat may be applied to the flushing mixture to soften or melt the flushing agent or resin. In embodiments of the invention, heat may be applied to the flushing agent before it is mixed with the dry pigment. In embodiments of the invention, heat may be applied to the flushing mixture (for example, the dry pigment and the flushing agent). Kinetic energy from the mixer is also converted into heat by viscous dissipation, and therein keeps the flushing agent softened and melted and disperses the pigment. In the previously disclosed wet pigment, the kinetic energy also separates the water from the wet pigment. In embodiments of the invention where dry pigment is utilized, no water is removed. The temperature of this pigment dispersion as a result of the heat generated from the mixing ranges from 80° C. to about 160° C. In embodiments of the invention, the temperature range is 100° C. to 140° C. The flushing step can be allowed to continue from about 15 minutes to four hours, with 20 minutes to about two hours being an average flushing step duration. The duration of the flushing step is dependent on the nature of the ingredients used in the flushing step. The temperature of the mixture in the flushing step may also be regulated by the use of a refrigerated heating circulator bath, a cold gun air coolant system, and the like. In previously disclosed embodiments using wet pigment, the heat generated by the mixing evaporates most of the water. Optionally, more water may be removed by, for example, vaporization, evaporation, decantation, centrifugation, or other means. In embodiments of the invention utilizing dry pigments, it may be advantageous to apply a vacuum to the pigment dispersion to aid in the wetting of the dry pigment by the flushing agent.

At the completion of the flushing step, the resulting pigment is wetted and dispersed with the flushing agent or resin and can more easily be mixed with one or more ink ingredients to form a phase change ink. The flushing process thus reduces or avoids the tedious and sometimes costly process of breaking down the pigmented aggregates during the ink making process. In embodiments of the invention, the dry flushed pigment comprises from about 20 to 80 percent by weight of pigment. In embodiments of the invention, the dry flushed pigment comprises from about 30 to 60 percent by weight of pigment.

FIG. 1 illustrates a process of manufacturing a phase chase ink utilizing dry flushed pigments according to an embodiment of the invention. The pigment flushing step starts with mixing 110 a dry pigment with a flushing agent. The dry pigment and flushing agent is heated 115 to a first temperature. Optionally, the flushing agent can be heated to a first temperature alone followed by the addition of the dry pigment. The heated dry pigment and flushing agent mixture is further mixed 120 to wet the dry pigment particles with the flushing agent and to disperse the pigment particles into the flushing agent. The product is referred to as the dry flushed pigment. In some embodiments of the invention, the dry flushed pigment of 120 may optionally be cooled and ground 125 to form a final dry flushed pigment.

Pigment Concentrate Preparation

The second mixing step disperses the flushed pigment in one or more of the components of the final phase change ink to form a pigment concentrate. The purpose of this mixing step is to reduce the pigment particle size and further to stabilize the said particle size so that reagglomeration does not take place.

Common practice for reducing particle size of pigments is to form a pigment concentrate wherein the pigment is dispersed in a liquid medium, either aqueous on nonaqueous, at high pigment concentration (higher than pigment concentration in final product) using one of a high number of milling or dispersion technologies. The choice of aqueous vs. nonaqueous depends on the form of the final product. For example, pigment concentrates for a latex paint will be aqueous (latex paints are water based). Similarly concentrates for aqueous ink jet inks will be aqueous. For solvent based inks, the pigment concentrate will be nonaqueous containing, for example, an organic solvent. Phase change inks such as disclosed in the present invention are also nonaqueous, and therefore, the pigment concentrate in the present invention needs to be nonaqueous.

There are several key points or factors to consider and highlight in the formation of pigment concentrates for phase change inks. The first key point is the selection of the medium which can be a single material or a mixture of materials. Since the pigment concentrate ends up in the final ink formulation, then it is highly preferable that the medium is selected from one or more of the components of the final ink, each of which plays a role in the performance of the said ink. The major component of the medium in the pigment concentrate can be the ink carrier. It carries the dispersed pigment into the final ink formulation, and is thus sometimes referred to as an ink vehicle. In embodiments of the invention, any suitable ink carrier can be employed, so long as the carrier is non-aqueous. For example, the carrier can be a wax or a non-polar solvent. In embodiments of the invention, the ink carrier is a wax such as Kemamide® S-180 stearyl stearamide wax.

In embodiments of the invention, the pigment concentrate composition contains a dispersant and an optional synergist needed to stabilize the pigment particles in the ink carrier by hindering the pigment particles from flocculating into larger agglomerates and thus delaying settling. Generally, the dispersant and optional synergist achieve this function by adhering to the pigment particles and providing steric stabilization. The dispersant compound and optional synergist compound adhere to the pigment by, for example, being absorbed, attached or grafted to the pigment particle.

Any suitable or desired dispersant can be selected. In embodiments of the invention, the dispersant is a polyethyleneimine prepared as described in Example 1 of U.S. Pat. No. 7,973,186. An optional synergist may be a modified sulphonated copper phthalocyanine.

Dispersion of the pigment into the pigment concentrate comprising carrier and dispersant and optional synergist is preferred at high pigment loading. It is known that achievement of desired particle sizes in pigment dispersion equipment is more effective with higher solids loadings. Also, a lower volume of concentrate has to be processed per unit weight of pigment when higher solids loadings are utilized, hence the cost of processing the pigment concentrate is lowered. In embodiments of the invention, the pigment loading occurs in excess of 10 percent by weight of the concentrate, and as high as 60 percent by weight. Dispersant and synergist loadings in the concentrate are often expressed as a weight ratio to the pigment. In embodiments of the invention, the dispersant to pigment ratio ranges from 0.05 to 2.0, and optionally the synergist to pigment ratio ranges from 0.05 to 2.0.

The dispersion of the pigment in the pigment concentrate process can be achieved by milling. Milling apparatuses include, for example, horizontal and vertical media mills, basket mills, immersion mills, attritors, various high shear homogenizers, extruders, and the like.

In embodiments of the invention, the process for the production of pigment concentrate herein can employ a Union Process Model 01 attritor with a capacity of 160 grams of product. The carrier and optional dispersant and/or the optional synergist can be added to the attritor tank and melted at the desired temperature. In embodiments, melting temperature can range from about 110 to about 160° C., although melting temperature is not limited to these ranges. After melting, the milling media is added to the melted mixture and stirred for a period of time at low speed using a stirring shaft. After the period of time, pigment is added into the mixture. In embodiments, the milling media comprise of ⅛ inch stainless steel balls and the stirring speed can range from 30 to about 100 revolutions per minute. After all the flushed pigment has been added to the melted mixture, the pigment is allowed to wet for any suitable or desired time while the melted mixture and pigment continue to be stirred. In embodiments of the invention, the pigment is allowed to wet from about 20 minutes to an hour. In embodiments of the invention, the stirring speed is increased to about 100 to about 300 revolutions per minute and the milling is carried out for any suitable or desired time. The desired time for milling may range from 1 to 3 hours. The milled pigment mixture product is discharged from the attritor.

There are many advantages of using dry flushed pigments instead of dry pigments in making the pigment concentrate, with the main one being that significantly less time is needed to achieve the desired pigment particle size. In embodiments, milling of dry pigments in an attritor can take up to 7 days whereas using dry flushed pigments can reduce the milling time to less than 3 hours. The dry flushed pigment is already preconditioned, meaning that it is already wetted by the flushing agent, and therefore, the particle size reduction process can proceed much more quickly.

Referring back to FIG. 1, the ink carrier and the optional dispersant and/or synergist is melted and mixed 130. The dry flushed pigment, which was created in step 120 or 125, is then mixed 135 with the melted mixture. The melted mixture is milled or ground 140 utilizing an attrition process, which creates the pigment concentrate. In some embodiments of the invention, the pigment concentrate created in step 140 is optionally cooled or ground. The formation of the pigment concentrate reduces the particle size of the pigment and also provides additional mixing time so that the pigment concentrate is well dispersed and stabilized. In this step, the mixture is heated to a temperature above the melting point of the wax, and the mixing is carried out in a high shear mixer, for example, an attritor or Hockmeyer immersion mill.

Phase Change Ink Preparation

The next step is the preparation of the phase change ink from the pigment concentrate. Referring back to FIG. 1, the pigment concentrate is melted and mixed 150. Separately, a plurality of ink base components are also melted and mixed 155. The melted and mixed pigment concentrate is combined 160 with the melted and mixed plurality of ink base components. The combined melted mixture of intermediate pigment concentrate is then mixed together 165. Finally, the mixed combined pigment concentrate is filtered 170 to make the phase change ink.

The phase change ink may be comprised of many components including carriers, colorants, synergists, dispersants, etc. In embodiments of the invention, the phase change ink may include a pigment from dry flushed pigment, an ink carrier, a dispersant and an optional synergist.

Ink Carrier

Phase change inks as disclosed herein contain a phase change carrier system or composition. The phase change carrier composition is typically designed for use in either a direct printing mode, or an indirect or offset printing transfer system. In one embodiment of the direct printing mode, the phase change carrier composition contains one or more materials that enable the phase change ink (1) to be applied in a thin film of uniform thickness on the final recording substrate (such as paper, transparency material, and the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability. In one embodiment of the offset printing transfer or indirect printing mode, the phase change carrier composition exhibits not only the characteristics desirable for direct printing mode inks, but also certain fluidic and mechanical properties desirable for use in such a system. The fluidic and mechanical properties of the phase change carrier composition are described in, for example, U.S. Pat. No. 5,389,958, the disclosure of which is totally incorporated herein by reference.

Any desired or effective carrier composition can be used. Examples of suitable ink carrier materials for the phase change inks include fatty amides, such as monoamides, triamides, tetra-amides, mixtures thereof, and the like. Specific examples of suitable fatty amide ink carrier materials include i) stearyl stearamide; ii) a dimer acid based tetra-amide that is the reaction product of dimer acid, ethylene diamine, and stearic acid; and iii) a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

wherein R is an alkyl group, including linear, branched, saturated, unsaturated, and cyclic alkyl groups. In one embodiment, the alkyl group has at least about 36 carbon atoms; in a second embodiment the alkyl group has at least about 40 carbon atoms; in a third embodiment, said alkyl group having no more than about 100 carbon atoms; in a fourth embodiment the alkyl group having no more than about 150 carbon atoms, and in a fifth representative, but not limiting embodiment, the alkyl group having no more than about 200 carbon atoms. The number of carbon atoms may also be outside of these ranges. Carboxylic acids of this formula are commercially available from, for example, Baker Petrolite, located in Tulsa, Okla. Carboxylic acids can also be prepared as described in Example 1 of U.S. Pat. No. 6,174,937, the disclosure of which is totally incorporated herein by reference. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2 238 792, the disclosures of each of which are totally incorporated herein by reference. Also suitable are branched triamides as disclosed in U.S. Pat. No. 6,860,930, the disclosure of which is totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

Mixtures of fatty amide materials and isocyanate-derived materials can also be employed as the ink carrier materials.

Additional suitable phase change ink carrier materials include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

Specific examples of suitable waxes include polyethylene waxes such as PE 500 and PE 655, available from Baker Petrolite, Tulsa, Okla.; Fischer-Tropsch waxes, available from Sasol Wax Americas, Inc., Shelton, Conn.; and waxes as disclosed in, for example, U.S. Pat. Nos. 7,407,539, 7,377,971, and 7,381,254, the disclosures of each of which are totally incorporated herein by reference, or the like, as well as mixtures thereof.

In one specific embodiment, the phase change ink carrier comprises (a) a polyethylene wax, present in the ink in an amount in one embodiment of at least about 25 percent by weight of the ink, in another embodiment of at least about 30 percent by weight of the ink, and in yet another embodiment of at least about 37 percent by weight of the ink, and in one embodiment of no more than about 60 percent by weight of the ink, in another embodiment of no more than about 70 percent by weight of the ink, and in yet another embodiment of no more than about 80 percent by weight of the ink, although the amount can be outside of these ranges; (b) a stearyl stearamide wax, present in the ink in an amount in one embodiment of at least about 3 percent by weight of the ink, in another embodiment of at least about 5 percent by weight of the ink, and in yet another embodiment of at least about 8 percent by weight of the ink, and in one embodiment of no more than about 25 percent by weight of the ink, in another embodiment of no more than about 28 percent by weight of the ink, and in yet another embodiment of no more than about 32 percent by weight of the ink, although the amount can be outside of these ranges; (c) a branched triamide of the formula

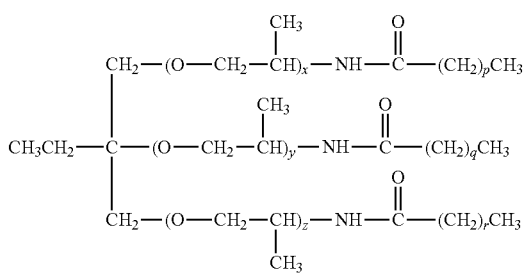

wherein x, y, and z each independently represent the number of propyleneoxy repeat units and x+y+z is from about 5 to about 6, and wherein p, q, and r each, independently of the others, are integers representing the number of repeat —(CH2)- units, wherein p, q, and r have an average value of from about 35, present in the ink in an amount in one embodiment of at least about 5 percent by weight of the ink, in another embodiment of at least about 8 percent by weight of the ink, and in yet another embodiment of at least about 10 percent by weight of the ink, and in one embodiment of no more than about 22 percent by weight of the ink, in another embodiment of no more than about 27 percent by weight of the ink, and in yet another embodiment of no more than about 32 percent by weight of the ink, although the amount can be outside of these ranges; (d) a triglyceride of hydrogenated abietic acid, present in the ink in an amount in one embodiment of at least about 6 percent by weight of the ink, in another embodiment of at least about 8 percent by weight of the ink, and in yet another embodiment of at least about 10 percent by weight of the ink, and in one embodiment of no more than about 12 percent by weight of the ink, in another embodiment of no more than about 14 percent by weight of the ink, and in yet another embodiment of no more than about 16 percent by weight of the ink, although the amount can be outside of these ranges; (e) a urethane resin that is the adduct of three equivalents of stearyl isocyanate and a glycerol-based propoxylate alcohol, present in the ink in an amount in one embodiment of at least about 2 percent by weight of the ink, in another embodiment of at least about 3 percent by weight of the ink, and in yet another embodiment of at least about 4.5 percent by weight of the ink, and in one embodiment of no more than about 7.5 percent by weight of the ink, in another embodiment of no more than about 10 percent by weight of the ink, and in yet another embodiment of no more than about 13 percent by weight of the ink, although the amount can be outside of these ranges; and (f) an antioxidant, present in the ink in an amount in one embodiment of at least about 0.01 percent by weight of the ink, in another embodiment of at least about 0.05 percent by weight of the ink, and in yet another embodiment of at least about 0.1 percent by weight of the ink, and in one embodiment of no more than about 0.3 percent by weight of the ink, in another embodiment of no more than about 0.5 percent by weight of the ink, and in yet another embodiment of no more than about 1 percent by weight of the ink, although the amount can be outside of these ranges.

The ink carrier is present in the phase change ink in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 95 percent by weight of the ink, in another embodiment of no more than about 98 percent by weight of the ink, and in yet another embodiment of no more than about 99 percent by weight of the ink, although the amount can be outside of these ranges.

The inks can also optionally contain an antioxidant. The optional antioxidants of the ink compositions protect the images from oxidation and also protect the ink components from oxidation during the heating portion of the ink preparation process. Specific examples of suitable antioxidants include NAUGUARDå 524, NAUGUARDå 76, NAUGUARD® 445, and NAUGUARDå 512 (commercially available from Uniroyal Chemical Company, Oxford, Conn.), IRGANOXå 1010 (commercially available from Ciba Geigy), and the like. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 3 percent by weight of the ink, in another embodiment of no more than about 5 percent by weight of the ink, and in yet another embodiment of no more than about 20 percent by weight of the ink, although the amount can be outside of these ranges.

The inks disclosed herein are phase change inks. Phase change inks are solids at a temperature of about 25° C. and are liquids when melted at temperatures of at least about 40° C. or higher. The ink compositions in one embodiment of the invention have peak melting points of no lower than about 50° C., in a second embodiment of the invention melting points of no lower than about 60° C., in a third embodiment of the invention have peak melting points no lower than about 70° C., in a fourth embodiment of the invention have peak melting points of no higher than about 100° C., in a fifth embodiment have peak melting points of no higher than about 140° C., and in a sixth embodiment have peak melting points of no higher than about 160° C., although the peak melting point can be outside of these ranges.

The ink compositions in one embodiment have onset melting points of no lower than about 50° C., in a second embodiment have onset melting points of no lower than about 52° C., in a third embodiment have onset melting points of no lower than about 55° C., in a fourth embodiment have onset melting points of no higher than about 69° C., in a fifth embodiment have onset melting points of no higher than about 72° C., and in a sixth embodiment have onset melting points of no higher than about 75° C., although the onset melting point can be outside of these ranges.

The ink compositions generally have melt viscosities at the jetting temperature in a first embodiment no lower than about 75° C., in a second embodiment no lower than about 85° C., in a third embodiment no lower than about 95° C., in a fourth embodiment no higher than about 120° C., in a fifth embodiment no higher than about 150° C., (although the jetting temperature can be outside of these ranges). In a first embodiment of no more than about 30 centipoise, in a second embodiment of no more than about 20 centipoise, and in a third embodiment of no more than about 15 centipoise, and in a fourth embodiment of no less than about 7 centipoise, in a fifth embodiment of no less than about 5 centipoise, and in an sixth embodiment of no less than about 2 centipoise, although the melt viscosity can be outside of these ranges. In another specific embodiment, the inks have viscosities of from about 7 to about 15 centipoise at temperatures of about 110, 115, and/or 120° C.

Ink Dispersant and Synergist

Dispersant compounds can be used as dispersants in phase change inks. The phrase "used as a dispersant" means that the dispersant compound stabilizes the pigment particles in the ink vehicle by hindering the pigment particles from flocculating into larger agglomerates and thus delay settling. Generally, the dispersant compound achieves this function by adhering to the pigment particles and providing steric stabilization. The dispersant compound adheres to the pigment by, for example, being absorbed, attached or grafted to the pigment particle. In embodiments, the dispersant compound may be present in the ink in an amount of from about 0.1 to about 25 percent by weight of the ink. For example, in a particular embodiment of the invention, the dispersant compound may be present in the ink in an amount of from about 1 to about 10 percent by weight, or from about 1 to about 5 percent by weight.

Optionally, the amount of dispersant utilized is expressed as a ratio of dispersant to pigment in the ink. For example, in a particular embodiment of the invention, the dispersant compound may be present in the ink in an amount of from about 0.1:1 to about 2:1 dispersant to pigment ratio by weight.

The inks of the present disclosure can also optionally contain one or more dispersants and/or one or more surfactants for their known properties, such as controlling wetting properties of the ink composition, and stabilizing pigmented colorants. Any suitable or desired dispersant can be selected, such as Solsperse® 13240 and Solsperse® 11000 dispersants, available from Lubrizol, and dispersants described U.S. Pat. No. 7,973,186, which is hereby incorporated by reference herein in its entirety.

Other examples of suitable additives that may be used in embodiments include, but are not limited to, MODAFLOW 2100, available from Cytec Surface Specialties, OLOA 1200, OLOA 11000, OLOA 11001, all available from Chevron Oronite Company LLC; SOLSPERSE 9000, 16000, 17000, 17940, 18000, 19000, 19240, 20000, 34750, 36000, 39000, 41000, 54000, all available from Lubrizol Corporation; and mixtures thereof. Exemplary ink compositions may include one or more dispersants and/or one or more surfactants for their known properties, such as controlling wetting properties of the ink composition, and stabilizing colorants. The dispersant may comprise from about 0.1 to about 25 percent by weight of the ink composition, such as from about 0.5 to about 10 percent, from about 1 to about 6 percent, or from about 2 to about 5 percent.

In addition to dispersants, it is necessary to supplement the dispersant with an additional synergist in the case of some pigments that are especially difficult to wet. The synergist acts like a primer in paint systems and aids in the stabilization of the pigment in the ink medium. Examples of synergists include but are not limited to modified sulphonated copper phthalocyanines including SOLSPERSE 13240, SOLSPERSE 5000 both obtained from The Lubrizol Corporation or SUNFLO SFD B-124, obtained from Sun Chemical Corporation.

Ink Colorant

The phase change ink herein can contain any suitable or desired colorant such as dyes, pigments, mixtures thereof, and the like. The colorant can be present in the ink in any desired or effective amount to obtain the desired color or hue, in embodiments, in an amount of from about 0.1 percent by weight of the ink to about 50 percent by weight of the ink, from about 0.1 percent by weight of the ink to about 20 percent by weight of the ink, although the amount can be outside of these ranges.

In specific embodiments of the invention, the colorant is a pigment. In a specific embodiment, the colorant is a pigment selected from the group consisting of a magenta pigment, a cyan pigment, a yellow pigment, a black pigment, and mixtures and combinations thereof. Pigment dispersions in the ink base may be stabilized by synergists and dispersants.

Examples of suitable pigments include PALIOGEN® Violet 5100 (BASF); PALIOGEN® Violet 5890 (BASF); HELIOGEN® Green L8730 (BASF); LITHOL® Scarlet D3700 (BASF); SUNFAST® Blue 15:4 (Sun Chemical); Hostaperm® Blue B2G-D (Clariant); Hostaperm® Blue B4G (Clariant); SPECTRA® PAC C Blue 15:4 (Sun Chemical); Permanent Red P-F7RK; Hostaperm® Violet BL (Clariant); LITHOL® Scarlet 4440 (BASF); Bon Red C (Dominion Color Company); ORACET® Pink RF (BASF); PALIOGEN® Red 3871 K (BASF); SUNFAST® Blue 15:3 (Sun Chemical); PALIOGEN® Red 3340 (BASF); SUNFAST® Carbazole Violet 23 (Sun Chemical); LITHOL® Fast Scarlet L4300 (BASF); SUNBRITE® Yellow 17 (Sun Chemical); HELIOGEN® Blue L6900, L7020 (BASF); SUNBRITE® Yellow 74 (Sun Chemical); SPECTRA® PAC C Orange 16 (Sun Chemical); HELIOGEN® Blue K6902, K6910 (BASF); SUNFAST® Magenta 122 (Sun Chemical); HELIOGEN® Blue D6840, D7080 (BASF); Sudan Blue OS (BASF); NEOPEN® Blue FF4012 (BASF); PV Fast Blue B2GO1 (Clariant); IRGALITE® Blue GLO (BASF); PALIOGEN® Blue 6470 (BASF); Sudan Orange G (Aldrich); Sudan Orange 220 (BASF); PALIOGEN® Orange 3040 (BASF); PALIOGEN® Yellow 152, 1560 (BASF); LITHOL Fast Yellow 0991 K (BASF); PALIOTOL® Yellow 1840 (BASF); NOVOPERM® Yellow FGL (Clariant); Ink Jet Yellow 4G VP2532 (Clariant); Toner Yellow HG (Clariant); Lumogen® Yellow D0790 (BASF); Suco-Yellow L1250 (BASF); Suco-Yellow D1355 (BASF); Suco Fast Yellow D1355, D1351 (BASF); HOSTAPERM® Pink E 02 (Clariant); Hansa Brilliant Yellow 5GX03 (Clariant); Permanent Yellow GRL 02 (Clariant); Permanent Rubine L6B 05 (Clariant); FANAL® Pink D4830 (BASF); CINQUASIA® Magenta (DU PONT); PALIOGEN® Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Control Example I demonstrates the extremely high process time required to process pigmented ink concentrates in an attritor starting with a dry pigment as is known in the art. Control Example II is an illustration of a dispersion process utilizing an immersion mill wherein milling the dry pigment necessitates shorter dispersion process time as is known in the art. The milling of the dry pigment in Control Example II uses a more expensive technology than attrition. Examples III to V illustrate the improvements achieved by the present invention using dry flushed pigments and a low cost attrition process. The attrition process takes up to 3 hours to complete in Examples III to V. The dry flushed pigment in these examples comprise magenta pigment and Kemamide® S-180 stearyl stearamide wax. Inks prepared with the pigment dispersions of Examples III to V meet performance requirements in a Xerox phase change printer. In Comparative Examples 6 and 7, inks produced with wet flushed pigment are compared to inks produced with dry flushed pigment. Comparative Examples 6 and 7 illustrate the superior performance of the dry flushed pigment versus wet flushed pigment as indicated by their respective good and poor performance in a Xerox phase change printer.

The components used in the pigmented phase change ink concentrates and phase change inks of the following Examples are described in Tables 1 and 2 respectively.

TABLE 1

Pigment concentrate

| Component | Composition Weight Percent |
|---|---|
| Kemamide ® S-180 | Stearyl stearamide available from Chemtura Corporation |
| Solsperse ® 17000 | Polymeric dispersant available from Lubrizol Corporation |
| Polyethyleneimine dispersant | As prepared in Example 1 of U.S. Pat. No. 7,973,186 (see below) |
| Pigment Red 57:1 | Magenta pigment available from Clariant Corporation or Sun Chemical Corporation |

TABLE 1-continued

Pigment concentrate

| Component | Composition Weight Percent |
|---|---|
| Mogul ® L | Carbon black available from Cabot Corporation |
| Solsperse ® 5000 | A derivatized sulfonated copper phthalocyanine synergist |

TABLE 2

Phase change ink

| Component | Composition Weight Percent |
|---|---|
| Polyethylene wax | A fractionated polyethylene wax available from The International Group Inc |
| Triamide wax | As prepared in Example 2 of U.S. Pat. No. 6,860,930 (see below) |
| Kemamide ® S-180 | Stearyl stearamide available from Chemtura Corporation |
| KE-100 ® | An ester of tetrahydroabietic acid and glycerol available from Arakawa Industries |
| Urethane resin | As prepared in Example 4 of U.S. Pat. No. 6,309,453 (see below) |
| Naugard ® 445 | Antioxidant available from Uniroyal Chemical Company |

A triamide wax (as described in Example II of U.S. Pat. No. 6,860,930 is prepared by adding i) 350.62 grams (0.3675 moles) of UNICID® 550 (a mono-acid obtained from Baker-Petrolite Corp., Cincinnati, Ohio, of the formula $CH_3(CH_2)_nCOOH$, wherein n has an average value of about 37 and is believed to have a range of from about 34 to about 40) and ii) 0.79 grams of NAUGARD® 524 (antioxidant obtained from Uniroyal Chemical Company, Inc., Middlebury, Conn.) to a 1,000 milliliter four-neck round bottom flask fitted with a Trubore stirrer, nitrogen inlet, Dean-Stark trap with condenser and nitrogen outlet and thermocouple-temperature controller. The mixture was heated to 115° C. to melt and stirred at atmospheric pressure under nitrogen. 51.33 grams (0.1167 moles) of JEFFAMINE® T-403 (mixture of triamines obtained from Huntsman Corporation, Houston, Tex., of the formula

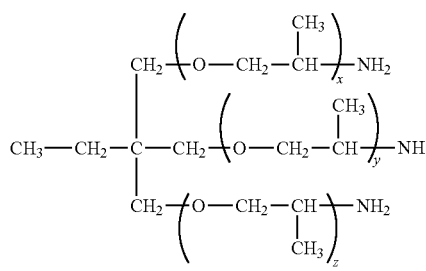

wherein x, y, and z are each integers representing the number of repeat propyleneoxy units, wherein x, y, and z may each be zero, and wherein the sum of x+y+z is from about 5 to about 6) was then added to the reaction mixture. The reaction temperature was increased to 200° C. gradually over 0.5 hour and held at that temperature for another 3 hours. Some water was carried out by slow blowing nitrogen and condensed into the trap when the mixture temperature reached about 180° C. The trap and condenser were then removed, and vacuum (about 25 mm Hg) was applied for about 0.5 hour and then released. The liquid product was cooled down to about 150° C. and poured onto aluminum to solidify. The resulting product was believed to be of the formula

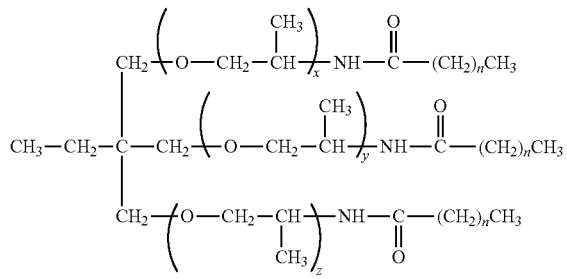

wherein n, x, y, and z are as defined hereinabove in this Example.

A dispersant as described in Example 1 of U.S. Pat. No. 7,973,186, is prepared as follows. 192.78 grams of Unicid® 700 (a long chain, linear carboxylic acid having an average carbon chain length of 48, available from Baker Petrolite) and 60.3 grams of E-100® (a mixture of tetraethylenepentamine, (TEPA), pentaethylenehexamine (PEHA), hexaethyleneheptamine (HEHA), and higher molecular weight materials with a number-average molecular weight of 250 to 300 grams per mole, available from Huntsman) is introduced into a 1 liter resin kettle fitted with heating mantle, mechanical stirring, Dean-Stark trap, reflux condenser and temperature sensor. Under a stream of Argon, the temperature in the kettle was raised to 100° C. and the resin was allowed to melt. When the resin was completely melted, the temperature was gradually raised to 180° C. with stirring, and the reaction was allowed to proceed for 3 hours. 3.6 milliliters of water was collected into the Dean-Stark trap. The reaction was stopped, cooled down to 140° C. and discharged to an aluminum tray resulting in 249 grams of the amide as a beige solid.

A urethane resin prepared as described in Example 4 of U.S. Pat. No. 6,309,453, is prepared as follows. About 80.0 grams (0.052 moles) of ARCOL LHT 112 (glycerol propoxylate available from ARCO Chemical Co.) and about 46.6 grams (0.156 moles) octadecyl isocyanate (Mondur O-Octadecyl Isocyanate available from Bayer Corporation) are placed in a 200 milliliter beaker with a magnet and heated to 115° C. with a silicone oil bath. Five drops of catalyst (Fascat® 4202, dibutyltindilaurate available from Elf Atochem North American, Inc.) were added and the mixture was allowed to react for 2 hours at 115° C. An FT-IR of the reaction product showed the absence (disappearance) of a peak at ~2285 cm-1 (NCO) and the appearance (or increase in magnitude) of peaks at ~1740-1680 cm-1 and ~1540-1530 cm-1 corresponding to urethane frequencies. The final urethane product was then poured into a specimen jar and allowed to cool and harden. This final product was a solid at room temperature characterized by a viscosity of about 15.8 centipoise as measured by a Ferranti-Shirley cone-plate viscometer at about 135° C. and a melting point of about 23.8° C. as measured by a Differential Scanning calorimetry using a DuPont 2100 calorimeter at a scan rate of 20° C. per minute.

A polyethyleneimine dispersant prepared as described in Example 1 of U.S. Pat. No. 7,973,186, is prepared as follows. 192.78 grams of Unicid® 700 (a long chain, linear carboxylic acid having an average carbon chain length of 48, available from Baker Petrolite) and 60.3 grams of E-100® (a mixture of tetraethylenepentamine, (TEPA), pentaethylenehexamine (PEHA), hexaethyleneheptamine (HEHA), and higher molecular weight materials with a number-average molecular weight of 250 to 300 grams per mole, available from Huntsman) are introduced into a 1 liter resin kettle fitted with heating mantle, mechanical stirring, Dean-Stark trap, reflux condenser and temperature sensor. Under a stream of Argon, the temperature in the kettle was raised to 100° C. and the resin was allowed to melt. When the resin was completely melted, the temperature was gradually raised to 180° C. with stirring, and the reaction was allowed to proceed for 3 hours. 3.6 milliliters of water was collected into the Dean-Stark trap. The reaction was stopped, cooled down to 140° C. and discharged to an aluminum tray to give 249 grams of the amide as a beige solid.

Control Example I

Carbon Black Pigment Concentrate in Attritor Using Dry Pigment

A Union Process Model 1S attritor with a tank capacity of 3 liters was charged with about 28 kilograms of ⅛ inch 440C stainless steel media. The pigment wetting step was carried out in a 4 liter stainless steel beaker by first adding about 1,051 grams of Kemamide® S-180 wax, about 79 grams of Solsperse® 5000 synergist and about 310 grams of Solsperse® 17000 polymeric dispersant. After melting the wax, synergist, and dispersant, approximately 360 grams of Mogul® L carbon black was added and stirred for an additional 60 minutes. The pigment slurry was then transferred to the attritor and attrition started. The attrition temperature was kept constant at approximately 120° C. After milling at about 240 revolutions per minute for about 284 hours (12 days), the final concentrate comprising approximately 20 percent by weight carbon black with a dispersant-to-pigment ratio of approximately 0.86:1 was discharged and cooled. The Z-average particle size of the carbon black in the concentrate was about 80 nanometers with Polydispersity Index of about 0.141, as measured on a Malvern Zetasizer particle size analyzer.

Control Example II

Magenta Pigment Concentrate in Immersion Mill Using Dry Pigment

This experiment was performed in the Hockmeyer HCPN 1/16 Micro Immersion Mill. The mill tank was charged with approximately 1,420 grams of Kemamide® S-180 wax and approximately 300 grams of polyethyleneimine dispersant. After the wax and dispersant were melted, stirring was carried out for approximately 60 minutes followed by the addition of approximately 380 grams of Pigment Red 57:1 magenta pigment over the period of about 30 minutes. The pigment was allowed to wet for about one hour at 4,500 revolutions per minute. The immersion mill head previously loaded with 0.3 millimeter zirconia milling media was immersed in the tank and milling started. After milling at about 5,200 revolutions per minute at about 123° C. for approximately 6 hours, the final concentrate comprising approximately 18 percent by weight Pigment Red 57:1 magenta pigment with a dispersant-to-pigment ratio of approximately 0.8:1 was discharged and cooled. The Z-average particle size of the pigment in the concentrate was approximately 122.3 nanometers with a Polydispersity Index of 0.104.

Example III

Magenta Pigment Concentrate in Attritor Using Dry Flushed Pigment

Dry flushed magenta pigment comprising about 60% by weight PR57:1 pigment and about 40% by weight Kemamide® S-180 wax was prepared in a flusher. The flusher may be a sigma mixer. Approximately 15.1 grams of S-180 wax and approximately 2.9 grams of polyethyleneimine dispersant were added to a clean Union Process Model 01 attritor tank and melted for approximately 1 hour at 120° C. Mixing was started at about 60 revolutions per minute for approximately 5 minutes followed by the addition of the dry flushed pigment. Approximately 12 grams of the dry flushed pigment was added to the mixture at a rate of approximately 1 gram per minute. After completion of dry flushed pigment addition, stirring was continued at approximately 60 revolutions per minute for approximately another 20 minutes. The mixing speed was then increased to approximately 200 revolutions per minute to begin the milling process. After milling at approximately 200 revolutions per minute at approximately 120° C. for approximately 3 hours, the final concentrate comprised about 24 percent by weight Pigment Red 57:1 magenta pigment with a dispersant-to-pigment ratio of approximately 0.4:1. The Z-average particle size of the pigment in the concentrate was approximately 133 nanometers with a Polydispersity Index of 0.11.

A phase change ink was prepared by mixing this concentrate with the ingredients listed in Table 2 at 120° C. in a stainless steel vessel for about 90 minutes. The resulting ink was filtered through a 5 micron 304 stainless steel filter (325 mesh×2300 mesh) at about 120° C. The resulting ink demonstrated good print quality performance in a Xerox phase change printer.

Example IV

Magenta Pigment Concentrate in Attritor Using Dry Flushed Pigment

Approximately 9.6 grams of S-180 wax and approximately 5.4 grams of polyethyleneimine dispersant were added to the clean attritor tank of Example III and melted for about 1 hour at 120° C. Mixing is started at approximately 60 revolutions per minute for about 5 minutes followed by the addition of the dry flushed pigment as used in Example III. Approximately 15 grams of the dry flushed pigment as used in Example III was added to the mixture at approximately 1 gram per minute. After completion of dry flushed pigment addition, stirring was continued at approximately 60 revolutions per minute for approximately 20 minutes. Then, the mixing speed was increased to approximately 200 revolutions per minute to begin the milling process. After milling at approximately 200 revolutions per minute at about 120° C. for about 3 hours, the final concentrate comprised about 30 percent by weight Pigment Red 57:1 magenta pigment with a dispersant-to-pigment ratio of about 0.6:1. The Z-average particle size of the pigment in the concentrate was about 125 nanometers with a Polydispersity Index of 0.11.

A phase change ink was prepared by mixing this concentrate with the ingredients listed in Table 2 at 120° C. in a stainless steel vessel for approximately 90 minutes. The resulting ink was filtered through a 5 micron 304 stainless steel filter (325 mesh×2300 mesh) at about 120° C. The resulting ink demonstrated good print quality performance in a Xerox phase change printer.

Example V

Magenta Pigment Concentrate in Attritor Using Dry Flushed Pigment

Approximately 8.1 grams of polyethyleneimine dispersant was added to the clean attritor tank of Example III and melted for about 1 hour at 120° C. Mixing was started at approximately 60 revolutions per minute for approximately 5 minutes followed by the addition of the dry flushed pigment as used in Example III. Approximately 22.5 grams of the dry flushed pigment was added to the dispersant at approximately 1 gram per minute. After completion of dry flushed pigment addition, stirring was continued at approximately 60 revolutions per minute for approximately another 20 minutes. Then, the mixing speed was increased to approximately 200 revolutions per minute to begin the milling process. After milling at approximately 200 revolutions per minute at approximately 120° C. for approximately 3 hours, the final concentrate was formed comprising about 44 percent by weight Pigment Red 57:1 magenta pigment with a dispersant-to-pigment ratio of approximately 0.6:1. The Z-average particle size of the pigment in the concentrate was approximately 105 nanometers with a Polydispersity Index of 0.06.

A phase change ink was prepared by mixing this concentrate with the ingredients listed in Table 2 at 120° C. in a stainless steel vessel for approximately 90 minutes. The resulting ink was filtered through a 5 micron 304 stainless steel filter (325 mesh×2300 mesh) at approximately 120° C. The resulting ink demonstrated good print quality performance in a Xerox phase change printer.

Comparative Example VI

Magenta Pigment Concentrate in Attritor Using Dry Flushed Pigment

Approximately 19.9 grams of S-180 wax and approximately 1.1 grams of polyethyleneimine dispersant were added to the clean attritor tank of Example III and melted for approximately 1 hour at 120° C. Mixing was started at approximately 60 revolutions per minute for approximately 5 minutes followed by the addition of the dry flushed pigment as used in Example III. 9 grams of the dry flushed pigment was added to the mixture at a rate of approximately 1 gram per minute. After completion of dry flushed pigment addition, stirring was continued at approximately 60 revolutions per minute for approximately another 20 minutes. Then, the mixing speed was increased to approximately 200 revolutions per minute to begin the milling process. After milling at approximately 200 revolutions per minute at approximately 120° C. for approximately 3 hours, the final concentrate was formed comprising about 18 percent by weight Pigment Red 57:1 magenta pigment with a dispersant-to-pigment ratio of approximately 0.2:1. The Z-average particle size of the pigment in the concentrate was approximately 106 nanometers with a Polydispersity Index of 0.19.

A phase change ink was prepared by mixing this concentrate with the ingredients listed in Table 2 at 120° C. in a stainless steel vessel for about 90 minutes. The resulting ink which was filtered through a 5 micron 304 stainless steel filter (325 mesh×2300 mesh) at about 120° C. demonstrated good print quality performance in a Xerox phase change printer.

Comparative Example VII

Magenta Pigment Concentrate in Attritor Using Wet Flushed Pigment

Wet flushed magenta pigment comprising about 60% by weight PR57:1 pigment and about 40% by weight S-180 wax was prepared in a flusher. In a wetcake, when a wet flushed process is being used, water comprises less than 50 percent by weight of the wetcake. In an embodiment of the invention, the flusher may be a sigma mixer. Approximately 19.9 grams of S-180 wax and approximately 1.1 grams of polyethyleneimine dispersant were added to the clean attritor tank of Example III and melted for approximately 1 hour at 120° C. Mixing was started at approximately 60 revolutions per minute for approximately 5 minutes followed by the addition of the wet flushed pigment. Approximately 9 grams of the wet flushed pigment was added to the mixture at approximately 1 gram per minute. After completion of wet flushed pigment addition, stirring was continued at approximately 60 revolutions per minute for approximately another 20 minutes. Then, the mixing speed was increased to approximately 200 revolutions per minute to begin the milling process. After milling at approximately 200 revolutions per minute at approximately 120° C. for approximately 3 hours, the final concentrate was formed comprising about 18 percent by weight Pigment Red 57:1 magenta pigment with a dispersant-to-pigment ratio of about 0.2:1. This is similar in composition to the concentrate of Comparative Example VI. The Z-average particle size of the pigment in the concentrate was about 154 nanometers with a Polydispersity Index of 0.09.

A phase change ink was prepared by mixing this concentrate with the ingredients listed in Table 2 at 120° C. in a stainless steel vessel for approximately 90 minutes. The resulting ink was filtered through a 5 micron 304 stainless steel filter (325 mesh×2300 mesh) at approximately 120° C. The resulting ink from Comparative Example VII demonstrated poor print quality performance in a Xerox phase change printer. Comparing the inks of Examples VI and VII to the inks of III, IV and IV, it is seen that the dry flushed pigment results in much superior inks as compared to the wet flushed pigment according to printing performance.

In embodiments of the invention using the dry flush process, water may hinder good flushing and mixing of the pigment into the flushing agent, (for example, Kemamide® S-180 wax). Water may also hinder wetting of the pigment (displacement of air or water with the flushing agent at the pigment surface).

The dry flushing process of the present invention results in better wetting (that is, displacement of air with the ink carrier, dispersant and/or synergist) of the pigment as compared to simply mixing the pigment and carrier/dispersant/synergist before reducing the pigment particle size. In the present invention, the formation of the concentrate (that is, the mixing of the dry flushed pigment with the one or more of ink carrier, dispersant and/or synergist) reduces the pigment particle size. The particle size reduction is much faster when a dry flushed pigment is utilized (that is, about 3 hours versus about 7 days). The flushing process results in much better wetting of the pigment than simply by mixing the pigment and carrier/dispersant/synergist before particle size reduction.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A method to produce a phase change ink, the method comprising the steps of:
    preparing a pigment concentrate by a dry flush method comprising
        providing a dry pigment,
        mixing a flushing agent with the dry pigment, wherein particles of the dry pigment are dispersed into the flushing agent and
        mixing one or more of a group of a first ink carrier, a first dispersant or a first synergist with the dry flushed pigment, wherein the mixture is milled to create the pigment concentrate;
            wherein the first ink carrier is a resin or waxy material providing the pigment concentrate;
    providing a second ink carrier;
    providing a second dispersant;
    providing an optional second synergist; and
    mixing the pigment concentrate, the second ink carrier, the second dispersant and the optional second synergist to make the phase change ink and wherein the first and optional second synergist adheres to particles of the pigment to provide steric stabilization.

2. The method to produce the phase change ink of claim 1, wherein the pigment is present in the amount from about 15 to 60 percent by weight of the pigment concentrate.

3. The method to produce the phase change ink of claim 1, wherein the pigment in the pigment concentrate has a Z-average particle size in the range of 75 nm to 250 nm.

4. The method to produce the phase change ink of claim 1, wherein the pigment in the pigment concentrate has a Polydisperity Index in a range of 0.01 to 0.5.

5. The method to produce the phase change ink of claim 1, wherein the first dispersant to pigment ratio by weight is present in the amount of 0.05 to 2.0 in the pigment concentrate.

6. The method to produce the phase change ink of claim 1, wherein the second synergist to pigment ratio by weight is present in the amount of 0.05 to 2.0.

7. The method to produce the phase change ink of claim 1, wherein the flushing agent is stearyl stearamide wax.

8. The method to produce the phase change ink of claim 1, wherein the second ink carrier is stearyl stearamide wax.

* * * * *